(12) United States Patent
Woodbury, Jr.

(10) Patent No.: US 7,432,936 B2
(45) Date of Patent: Oct. 7, 2008

(54) TEXTURE DATA ANTI-ALIASING METHOD AND APPARATUS

(75) Inventor: William C. Woodbury, Jr., Gainesville, FL (US)

(73) Assignee: Avid Technology, Inc., Tewksbury, MA (US)

( * ) Notice: Subject to any disclaimer, the term of this patent is extended or adjusted under 35 U.S.C. 154(b) by 851 days.

(21) Appl. No.: 11/003,999

(22) Filed: Dec. 2, 2004

(65) Prior Publication Data

US 2006/0119599 A1 Jun. 8, 2006

(51) Int. Cl.
*G09G 5/00* (2006.01)
*G06T 17/00* (2006.01)
(52) U.S. Cl. ...................... 345/582; 345/420
(58) Field of Classification Search ............ 345/423
See application file for complete search history.

(56) References Cited

U.S. PATENT DOCUMENTS 6,256,038 B1 * 7/2001 Krishnamurthy ............ 345/419

2004/0001645 A1 * 1/2004 Snyder ........................ 382/276

OTHER PUBLICATIONS

Heckbert, Paul C., "Survey of Texture Mapping," IEEE Computer Graphics and Applications, Nov. 1986, pp. 1-15.

* cited by examiner

*Primary Examiner*—Kee M. Tung
*Assistant Examiner*—Aaron M Richer
(74) *Attorney, Agent, or Firm*—Peter J. Gordon; Fish & Richardson

(57) ABSTRACT

Computer-implemented methods of pre-filtering texture data and methods of generating a filter control for pre-filtering texture data for generating a graphics image are disclosed. The disclosed methods include determining encoded pre-filter characteristics representing a measure of the maximum change in a texture due to moving a least one pixel any direction in a graphics image. The encoded pre-filter characteristics can be used to control filtering of texture data for texture mapping a graphics image.

25 Claims, 5 Drawing Sheets

TEXTURE DATA ANTI-ALIASING METHOD AND APPARATUS

FIELD

This disclosure relates to computer graphics and, more particularly, to methods of filtering texture data.

INTRODUCTION

Computer graphics systems are used for creating images in a computer and displaying the images as a collection of picture elements ("pixels") on a display screen. Advancements in computer graphics have led to techniques for enhancing the realistic appearance of rendered objects. One such technique, texture mapping, enables surfaces of rendered images on a computer screen to be displayed with texture. Texture mapping can be used to depict surface parameters such as color, specular reflection, normal vector perturbation or "bump mapping," specularity, transparency, diffuse reflection, shadows, surface displacement, and local coordinate systems. Thus, for example, an image of a tabletop can be texture mapped to have the appearance of a wood-grain or marble surface, or an image of a side of a building can be texture mapped to appear as a brick wall. Texture mapping is therefore used, for example, to increase realism and surface detail in computer games, computer animation, and video effects for direct broadcast and post-production.

The digital graphics rendering process can be visualized as processing graphics data through a series of transformations into different coordinate spaces. An example of a three-dimensional ("3D") graphics rendering process, or "pipeline," is illustrated in FIG. 1.

A typical computer generated image is first created or "drawn" from a plurality of constituent geometric elements or "primitives," such as polygons, points, lines, and/or three-dimensional objects. The primitives can then be used to form a two-dimensional ("2D") image of 3D objects on a display screen. Each input primitive may contribute to one or more pixels of the final image.

Objects are initially defined, or "modeled," in local 2D coordinate space. One method for modeling an object is to use a polygon mesh. In the polygon mesh method, the surface of an object can be represented as a set of connected planar straight-sided polygons, and each polygon can be represented as a list of connected points. This form of representation is either exact or an approximation, depending on the nature of the object and the density of polygons. A cube, for example, can be represented exactly by six squares. A cylinder, on the other hand, can be approximated by polygons, for example, six rectangles for the curved surface and two hexagons for the end faces. The number of polygons used in the approximation determines how accurately the object is represented. The accuracy of the object representation can also impact the cost of rendering the object on a display screen or viewport.

A polygon mesh model may consist of a structure of vertices, each vertex representing a three-dimensional point in coordinate space, mathematically represented as a set of coordinate values, e.g., (X,Y,Z). While any polygon structure can be used to define a surface, in practice, triangles are often used. The triangles forming the surface of an object are then assembled into a "mesh" to model the object. Examples of objects represented by a triangle mesh are illustrated in FIG. 2.

FIG. 2 shows triangular representations of three objects having an approximate shape of a pyramid, a cube, and a sphere. Each object is shown with the surface represented by a different density of triangular approximations. As can be seen, the surface of an object is more accurately reproduced when a greater number of triangles is used to approximate the object. The triangle mesh object representation can be set up by the digital artist at the modeling stage, or can be calculated using an algorithm.

Once an object has been modeled, the object to be rendered is placed in a 3D scene having (X,Y,Z) "scene space" coordinates. Each object constituting a scene also has an independent local coordinate system, referred to as "object space" for that object. Each object of a scene must then be transformed into 3D scene space to define the relative spatial relationship among the objects.

The rendered 3D scene, including all objects, is then projected onto 2D screen space, such as a display. Pixels on a computer screen are assigned 2D (x,y) coordinates to represent the spatial location of the pixel on the computer screen. For example, a pixel with coordinates (5,10) would appear in the fifth column of pixels, and ten rows down on the computer screen.

Texture mapping is the process by which patterns are applied to, or "mapped," to the surface of an object. During the texture mapping process, an input image, or "texture," is mapped onto a representation of a 3D object surface and then, a 2D output image is produced by performing a perspective projection of the 3D surface onto 2D screen space. As illustrated in FIG. 1, in texture mapping, the source image, "texture," is mapped onto a surface such as a cylinder in 3D object space, which is then mapped to a destination image, or screen in 2D screen space for viewing.

In computer graphics, a texture is an array of pixels that represents a particular pattern. A pixel in a texture map is thus referred to as a "texel." A texture is used broadly to refer to the appearance of a surface in the usual sense, such as cloth, wood, gravel, fur, or any other pattern that can be repeated many times to tile a plane surface, such as for example, a brick wall. More generally, a texture can refer to a multi-dimensional image that is mapped to a multi-dimensional space. A texture map can be constructed from a 2D array of texels having (S,T) coordinates associated with each texel value in the texture map.

Sampling is the process of converting a continuous signal such as the brightness of a texture pattern, into a discrete representation. Resampling is the process of reconstructing a continuous signal from a plurality of discreet representations to produce a projection of the continuous signal on a display screen. Texture mapping is essentially a 2D resampling process in which digitally sampled input video or texture is geometrically transformed into an output image. The sampling and resampling process can result in an inaccurate reconstruction of the input texture producing undesirable "aliasing" artifacts that can degrade the quality of the texture where it reappears in the output image. Examples of aliasing artifacts include: (i) "flashing," "popping," or "strobing" with very small changes in the 3D rendering parameters; (ii) Moiré patterns sweeping through the output image, which can mask image content or convey false image content; and (iii) jagged or stair-step edges in the output image corresponding to smooth, sharp edges between or around shapes inside the original input image.

From a mathematical perspective, aliasing results when an image corresponding to a signal is "under-sampled." For example, when a high-resolution input texture is digitally sampled at a frequency insufficient to reproduce the high-resolution components, an output pixel might represent a single texel of a more complex input texture.

Two approaches to reduce aliasing to unobjectionable levels are: (1) point sampling at higher resolution, also referred to as "super-sampling;" and (2) low pass filtering before sampling. Point sampling at higher resolution can involve sampling at a resolution sufficient to include the highest frequencies present in the image or texture. Since a surface viewed, for example, obliquely, can generate arbitrarily high frequencies, the sampling rate necessary to remove aliasing artifacts or at least render aliasing artifacts insignificant can be extremely high. The computational times required to process at high sampling rates can be impractical for rendering real time video images. Although methods have been developed to limit super-sampling to regions of high frequency signals and high contrast by adapting the sampling rate to the local intensity variance, problems remain.

The second method, low pass filtering before sampling, is preferable because it addresses the causes of aliasing rather than its symptoms. To eliminate or reduce aliasing artifacts in texture mapping, low-pass filtering methods are designed to remove frequencies above the Nyquist limit. A low-pass filter passes or preserves low frequencies while attenuating or eliminating high frequency components of a continuous signal. The ideal low pass filter has gain of 1 at frequencies below the cutoff frequency, and gain of 0 above the cutoff frequency. However, the use of an ideal filter is computationally impractical. In practice, finite impulse response ("FIR") filters are used that attenuate, but do not entirely block, the high frequency components. The objective of low pass filtering is to pre-filter and thereby reduce the high frequency components of the texture, effectively band-limiting the input texture data to the Nyquist frequency before sampling. Pre-filtering can facilitate accurate transformation of a texture where it appears in the output image.

Refinements of the above-described methods have been developed to prevent or reduce aliasing artifacts in texture mapping. Examples of such refinements include: (i) bilinear interpolation only; (ii) MIP-mapping, pyramid filtering or tri-linear filtering; (iii) anisotropic filtering; (iv) super-sampling and multi-sampling with bilinear interpolation; and (v) super-sampling and multi-sampling without bilinear interpolation. Nevertheless, such "anti-aliasing" methods can be unsatisfactory for several reasons, including incomplete reduction of aliasing artifacts, loss of 1:1 transparency, impractically long computational times for processing real-time video images, over-softness, and/or the generation of additional artifacts. 1:1 transparency refers to the property that an output image is identical to the input image when texture mapping onto a flat rectangle with a three-dimensional transform that is It is therefore desirable to provide improved methods and apparatus for reducing aliasing in texture mapping a graphics image, and for providing high-quality texture detail from texture data suitable for real-time video display.

SUMMARY

A computer-implemented method of producing a graphics image is provided. The method comprises receiving 2D texture data and 2D object data for the graphics image; generating a primary polygon mesh comprising a list of polygons, polygon vertices, and texture for the graphics image from the 2D texture data and 2D object data; generating an auxiliary mesh comprising encoded pre-filter characteristics for the polygon vertices; rendering a filter control map from the auxiliary mesh; pre-filtering the texture data, wherein at least one characteristic of the pre-filter is determined by the filter control map; texture mapping the pre-filtered texture data and primary polygon mesh to generate the graphics image; and rendering the graphics image.

In another aspect, a computer-implemented method of generating a filter control for pre-filtering a texture is provided comprising generating a primary polygon mesh from texture data and object data, wherein the primary polygon mesh comprises a 3D polygon list, object coordinates, and texture coordinates for polygon vertices; calculating the projection of the object coordinates to viewport coordinates for polygon vertices in the primary polygon mesh; converting texture coordinates to viewport coordinates for polygon vertices in the primary polygon mesh; calculating a texture address function for polygons of the 3D polygon list; calculating four partial derivatives corresponding to mapping from mapping viewport coordinates to texture coordinates for polygons of the 3D polygon list; calculating at least one compression for the polygon vertices; calculating at least one average compression for polygon vertices of the primary polygon mesh; encoding at least one pre-filter characteristic for polygon vertices of the primary polygon mesh based on the at least one average compression; and rendering a filter control map by determining the at least one pre-filter characteristic for pixels within the polygons of the auxiliary mesh.

A graphics system for generating a filter control for pre-filtering a texture, and a computer-readable medium storing instructions executable by a processor to perform a method of generating a filter control for pre-filtering a texture are also provided.

The section headings used herein are for organizational purposes only, and are not to be construed as limiting the subject matter described.

DESCRIPTION

In conventional Digital Video Effects ("DVE") systems, the horizontal and vertical resample rates are calculated at each pixel of a texture and used to control the low-pass cutoff frequency, or "filter strength," of a horizontal low-pass pre-filter, and a vertical low-pass pre-filter. Such DVE systems are only capable of performing a 2D warp, or distortion, followed by a texture map of the warp output onto a single flat rectangle in three dimensions. The filter control of such systems uses estimates for the horizontal and vertical resample rates corresponding to mapping onto a 3D rectangle, and therefore, ignores the effect of distortion on the resampling rates. As a result, such DVE systems provide acceptable horizontal and vertical filter control only when there is no warping, for example when the texture comprises only 3D size, rotation, and position information. However, such systems provide poor filter control when there is warping.

Figure 1:
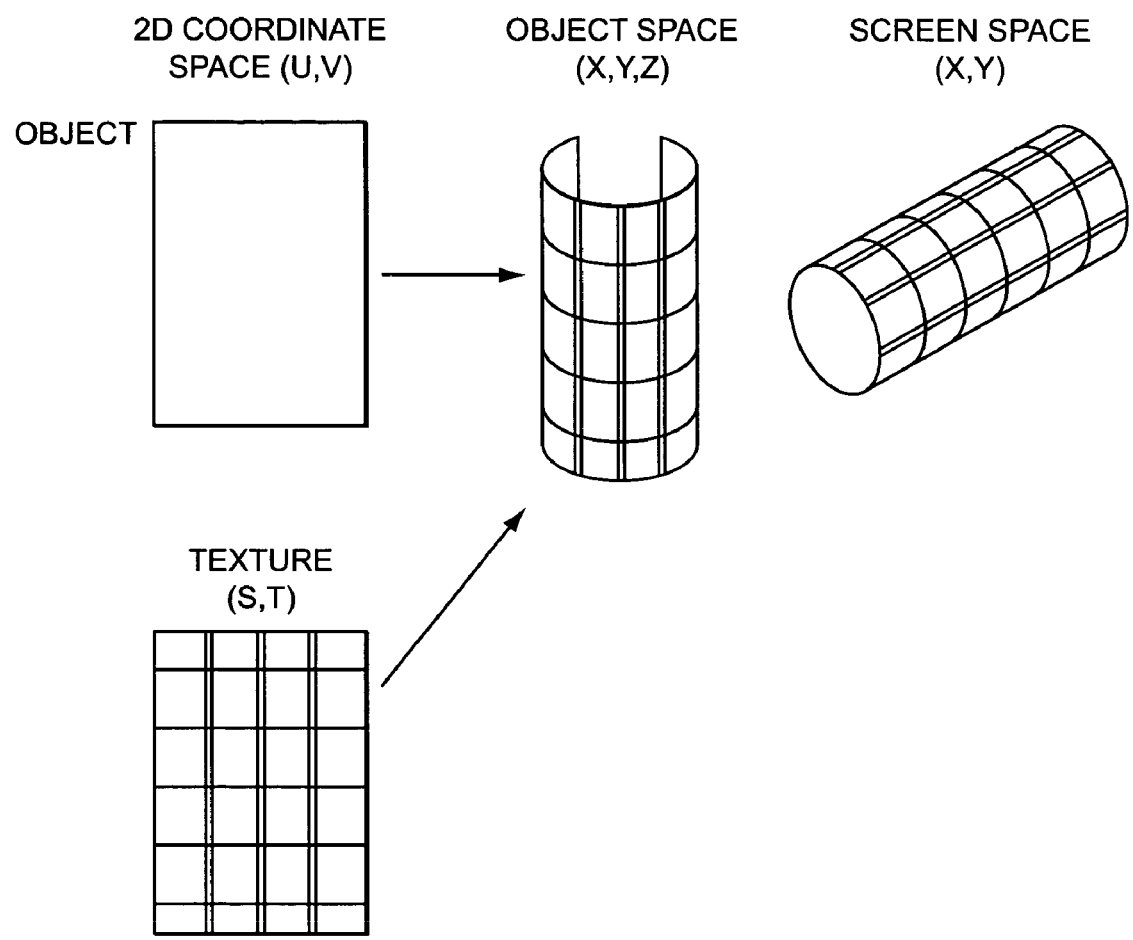
FIG. 1 is a schematic illustration of a 3D graphics image rendering process.
Figure 2:
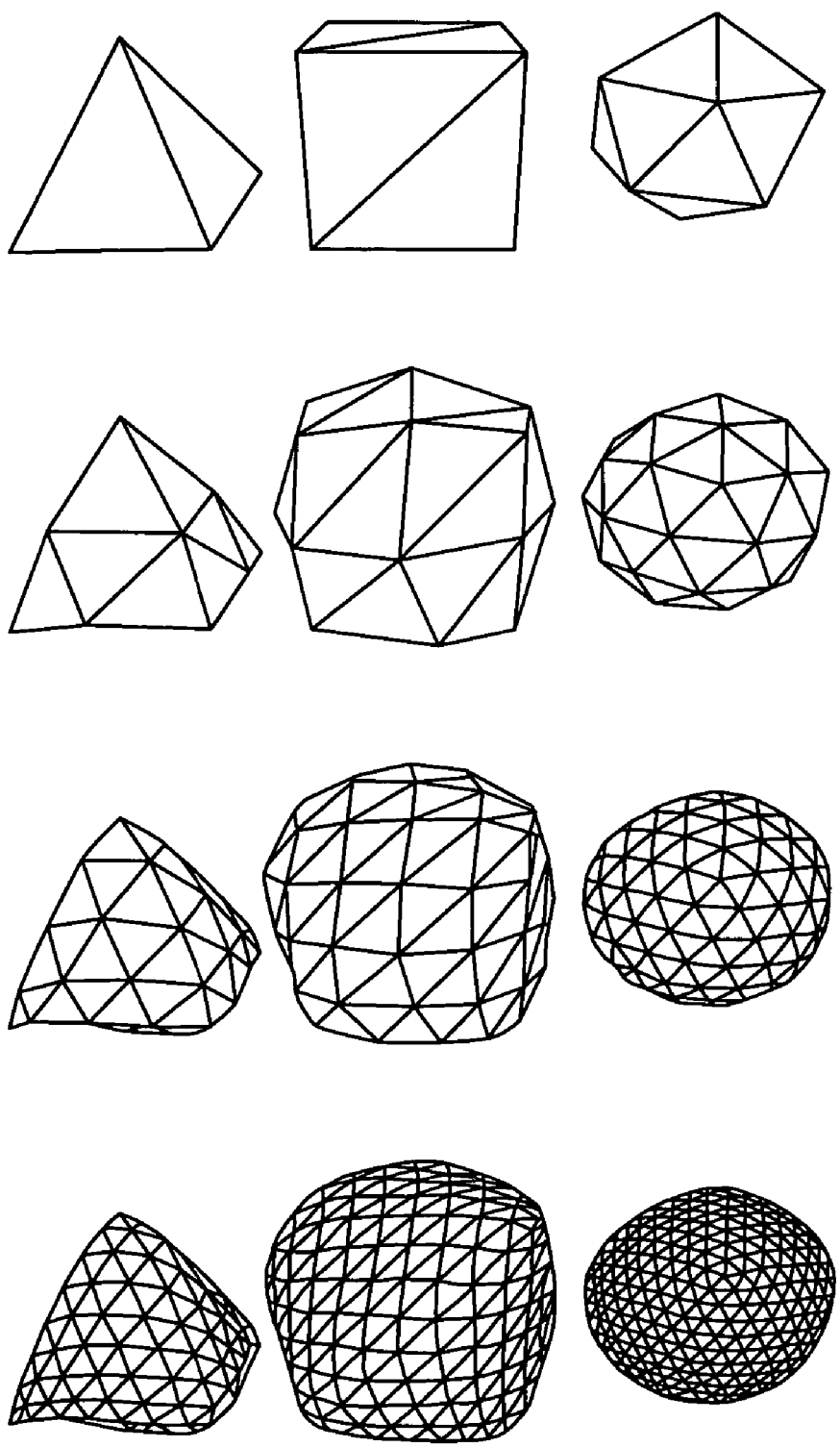
FIG. 2 is an illustration of triangular mesh object representations.
Figure 3:
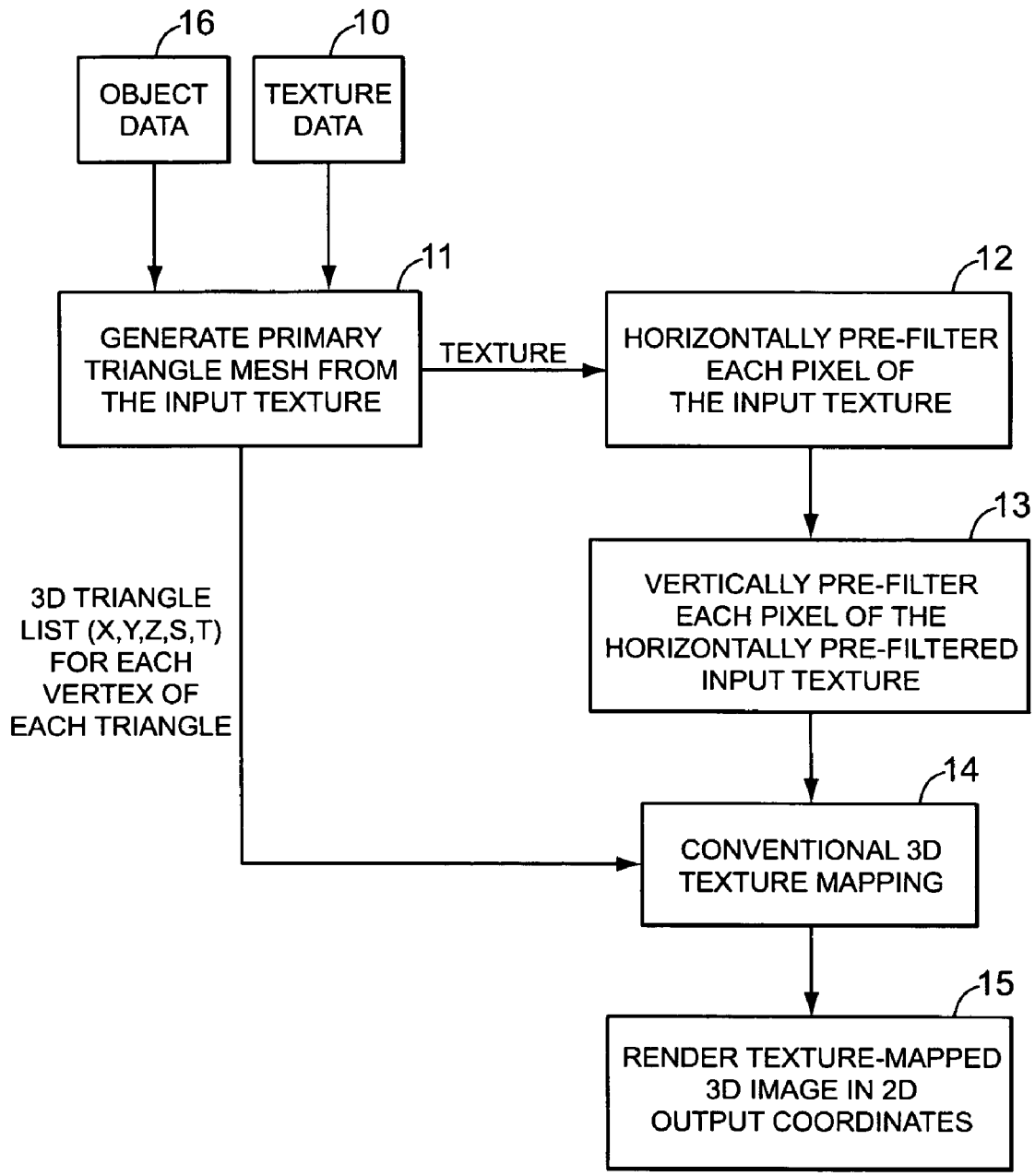
FIG. 3 is a block diagram of steps according to a conventional texture mapping method.

A block diagram of the steps used for rendering a texture mapped 3D image in a conventional DVE system is shown in FIG. 3. Object data 16 includes at least one object in 2D coordinate space that is used to form a graphics image. In certain embodiments, object data 16 can include more than one object comprising a graphics image. The object can be represented using a polygon mesh model as discussed herein. Texture data 10 includes at least one texture in 2D texture coordinate space that is used to form the graphics image, and in certain embodiments, can comprise more than one texture. A texture can be one-, two- or three-dimensional. In many applications, a texture can be a two-dimensional image, such as for example, a scanned image of a photograph. The 2D image is represented as a 2D array of texture elements, or "texels" having texture coordinates (S,T). Texture data 10 comprises an array of texels where the texels have color values RGB and optionally a transparency value. The array of texels is generally rectangular, such that, for example, a Standard Definition ("SD") video texture can comprise a 486×724 array of 24-bit texels. The array can have other appropriate dimensions.

In step 11, a primary polygon mesh can be generated from the object data and texture data by any appropriate method. The object can be represented by any appropriate set of geometric primitives including, for example, lines, points, triangles, polygons, and/or three-dimensional objects. Although the use of triangle primitives will be addressed throughout this disclosure, one skilled in the art will recognize that any appropriate primitive can be used to represent a surface of an object, including polygons and the like. The primary triangle mesh comprises a 3D triangle list for an object and associated texture data. Each triangle list comprises a set of entries for each triangle representing the surface of a 3D object. Each triangle entry includes the (X,Y,Z) object spatial coordinates and the (S,T) texture coordinates for the three vertices of the triangle.

In step 12, texels of texture data 10 are horizontally pre-filtered to eliminate or attenuate high frequency components. For example, a 5- to 7-tap FIR filter can be used to horizontally pre-filter texture data 10 such that texels are replaced with the weighted average of adjacent horizontal texels. Similarly, in step 13, a 5- to 7-tap FIR filter can be used to vertically pre-filter the horizontally pre-filtered input texture, in which each texel is replaced by the weighted average of adjacent vertical texels.

In step 14, the horizontally and vertically pre-filtered texture data is texture mapped onto 2D output coordinates as determined by the 3D to 2D transform defined by the primary triangular mesh generated in step 11. Bilinear interpolation can be used in texture mapping step 14 to fill in the color of each pixel. In addition to texture, in step 14 other parameters of a 3D scene can be determined such as field of view, shadowing, and the like.

In final step 15, the texture-mapped 3D image is rendered to produce a 2D output in viewport coordinates.

In the conventional texture mapping process schematically illustrated in FIG. 3, image quality is enhanced as the result of horizontal and vertical, 7-tap, low-pass FIR pre-filter operations. The pre-filters are applied to the input video texture before texture mapping to filter the high frequencies so as to resample the texture in the way dictated by the 3D transform that the texture will undergo. High and low frequencies can be filtered with a nearly continuously variable cut-off frequency for each pixel in the texture. The horizontal and vertical resampling frequency due to texture mapping determines the required horizontal and vertical filter strength at each pixel of the video texture. However, particularly for complex images, the resampling frequencies change for each pixel. While such filter strength control works well for a single 2D image plane undergoing any 3D transformation and viewed in perspective, the filter control is insensitive to warp. Thus, aliasing artifacts can arise when the texture is distorted over objects having, for example, oblique surfaces.

Although filter strength is used throughout to refer to a cut-off frequency of a low-pass filter such as an FIR filter, it will be appreciated that other characteristics of a filter can be defined and implemented to filter texture data. It will also be appreciated that more than one filter characteristic can be determined and/or that one or more characteristics for more than one filter can be determined.

A method of filtering texture data consistent with the present invention is provided that accounts for resample rates, and in particular the horizontal and vertical resample rates, at the pixels. Determining the horizontal and vertical resample rates at the pixels in an input texture to generate tailored filters for the pixels can facilitate texture mapping onto any 3D surface which can then be perspective projected into a 2D output image. In certain embodiments, the filtering method can analyze texture values corresponding to the 3D triangle mesh, the corresponding 2D triangle in the input texture, and the corresponding 2D triangle in the output rendered frame buffer to generate appropriate filters for the pixels. From this information a formula for the horizontal and vertical resample rates can be derived for the pixels within a 2D texture triangle. Rather than evaluate this complex formula exactly for the pixels, the formula can be evaluated, for example, at each of the three vertices of the 2D texture triangle and the results linearly interpolated during texture mapping to fill the corresponding pixels in the output image. A Graphics Processing Unit ("GPU") can perform the linear interpolation by constructing an auxiliary mesh in 2D texture coordinates, encoding the resample rates into vertex colors, and rendering the auxiliary mesh to produce a 2D filter control map. The filter control map comprising, for example, encoded values corresponding to the horizontal and vertical resample rates, can then be used to control a value of a filter characteristic, such as, for example, the strength, e.g., the cut-off frequency, or other filter characteristic of the horizontal and vertical pre-filters for the pixels.

Figure 4:
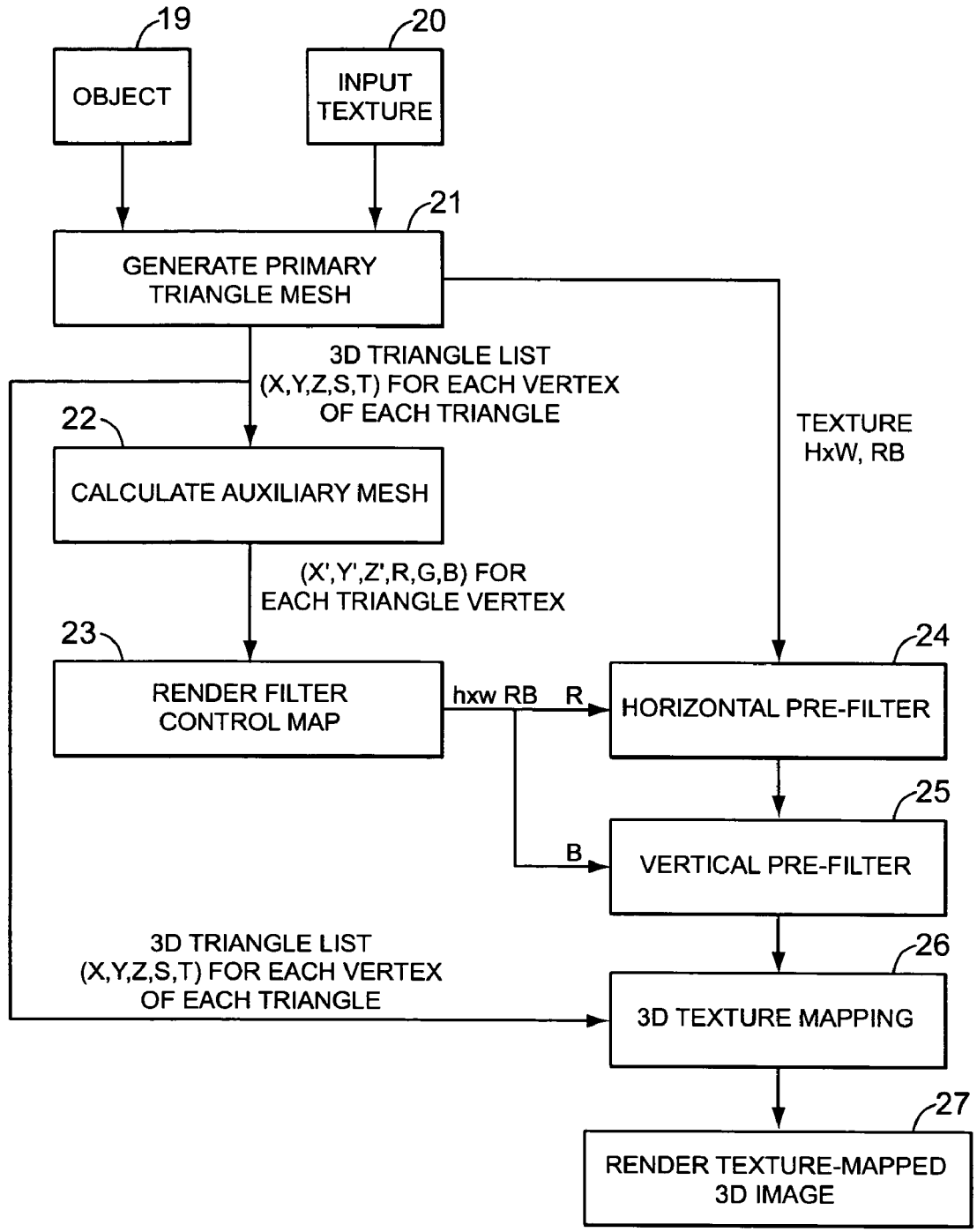
FIG. 4 is a block diagram of steps of a texture mapping method consistent with certain embodiments of the present invention.

FIG. 4 shows a block diagram of the steps used to render a 3D texture mapped image according to certain embodiments consistent with the present disclosure. In step 21, a primary triangle mesh can be generated from data 19 of at least one object and data 20 of at least one input texture. Texture data 20 can comprise color values RGB and optionally a transparency value for texels of an array of texels defining the texture. The array of texels can be rectangular, such that, for example, a SD video texture can comprise a 486×724 array of 24-bit texels. The array can have other appropriate shape and/or dimensions. Similar to the process shown in FIG. 3, the primary triangle mesh comprises the 3D triangle lists and texture for the texture-mapped 3D input texture including the 3D object coordinates (X,Y,Z) and the 2D texture coordinates (S,T) for the three vertices of each triangle, in addition to the array of RGB values for texels of the input texture data.

In step 22, an auxiliary mesh is generated from the primary triangle mesh constructed in step 21. The auxiliary mesh comprises the color values and the calculated values of the horizontal and vertical pre-filter strengths for each vertex of the triangles of the primary triangle mesh. As explained in greater detail below, values of the pre-filter strengths can depend at least in part on the 3D universe of objects to be rendered, to the viewing transforms to be applied to the primary triangle mesh, and to the dimensions of the 2D viewport into which the output image is to be rendered.

In step 23, the auxiliary mesh calculated in step 22 can be used to generate a filter control map. The filter control map may have the same dimensions as the input texture and may comprise the horizontal and vertical pre-filter strengths for each pixel. The filter control map is used to control the horizontal and vertical filtering operations. The filter control map may comprise a list of seven coefficients for each pixel of the graphics image to be rendered. The coefficients can correspond to one or more pre-filter characteristics used to control the horizontal and vertical filtering operations and are determined by methods disclosed herein.

In step 24, the filter control map can be used to control the horizontal pre-filtering of the input texture. In horizontal pre-filtering step 24, the input texture is convoluted with the filter control map such that the seven coefficients for each pixel are used to control the cut-off frequency for each input texel in a 1×7 convolution.

The horizontally filtered input texture is then vertically pre-filtered in step 25. As in horizontal pre-filtering step 24, vertical pre-filtering step 25, may consist of controlling the cut-off frequency for each input texture texel by the seven coefficients for each pixel of the filter control map in a 7×1 convolution. In step 26, the horizontally and vertically pre-filtered input texture is then texture mapped using any appropriate method. In step 27, the texture mapped 3D output image is rendered in 2D output coordinates, for example, on a viewport such as a computer monitor.

Nevertheless, it will be appreciated that the method diagrammed in FIG. 4 illustrates certain embodiments of a texture mapping method consistent with the present disclosure, and that other embodiments are included within the scope of the present disclosure. For example, in certain embodiments, geometric primitives, or polygon, other than triangles can be used to generate the primary mesh, such as rectangles, squares, and hexagons. In certain embodiments, the auxiliary mesh can be calculated for each vertex of each polygon in the primary mesh, for less than all vertices of each polygon, for each vertex of less than all polygons, or for less than all vertices of less than all polygons. In certain embodiments, a filter control map can be rendered for each polygon vertex or for less than all polygon vertices. In certain embodiments, the filter control map can be used to control horizontal filtering, vertical filtering, diagonal filtering, and/or other filtering vector. In certain embodiments, the entire input texture can be filtered, and in certain embodiments, only parts of the input texture can be filtered. Similarly, 3D texture mapping can be applied to all input data or to less than all input data. For example, in certain embodiments, the texture corresponding to a certain object or objects warranting high resolution in the 3D output image can be filtered using the methods of the present disclosure.

For convenience, the following description refers to embodiments wherein the input objects are modeled using a triangle mesh, each vertex of each triangle is used to generate the filter control map, the filter control map is used to control both horizontal and vertical texture pre-filtering, and all input data is texture mapped.

The texture mapping process schematically illustrated in FIG. 4 employs a procedure for determining horizontal and vertical resample rates at each pixel of the texture data and uses the pixel-specific resample rates to control the strengths (cut-off frequencies) of the horizontal and vertical pre-filters. As shown in FIG. 4, the horizontal and vertical filter control map is generated from the auxiliary mesh. The steps used to construct the auxiliary mesh and filter control map will now be described in greater detail.

Methods and apparatus consistent with the invention use RGB indices in the auxiliary mesh and in the filter control map. Although RGB indices are generally used in graphics processing to specify color characteristics, they can also be used to specify other characteristics of an image. Here, the R and B values (G is not used) are used to specify values of the pre-filter characteristics, such as for example, strengths of the horizontal and vertical pre-filters at a particular place or point in the texture used in the texture mapping process. For example, the horizontal pre-filter strength can be assigned to the R component and the vertical pre-filter strength can be assigned to the B component of an RGB parameter set. Standard 24-bit, RGB color formats, such as those commonly used by computer graphics cards, employ 8 bits (or 256 levels) of R, and 8 bits (or 256 levels) of B. Thus, in a 24-bit system, these R and B components can specify 256 strength levels for horizontal and vertical pre-filtering, respectively. In certain embodiments, a lesser or greater number of pre-filter strength levels can be used, and/or the filter control map can be used to define other characteristics of the pre-filters. Thus, the RGB indices can be used as a buffer or cache memory for storing information used to filter an image texture, as well as to specify color characteristics during 3D image rendering.

In certain embodiments, rather than using R to represent the horizontal pre-filter strength and B to represent the vertical pre-filter strength, the horizontal and vertical pre-filter strength values can be supplied in a different format. For example, a horizontal auxiliary mesh and a horizontal filter control map can be generated using an 8-bit value for the horizontal filter strength for each triangle vertex, and a separate vertical auxiliary mesh and vertical filter control map using a different 8-bit value for the vertical filter strength for each triangle vertex could also be generated. However, in certain embodiments, encoding the horizontal and vertical filter strength values into R and B components of an RGB buffer to generate a filter control map can facilitate the use of the same graphics rendering techniques to handle filter strength values as are normally employed to handle RGB colors during texture mapping.

The filter control map can be a rectangular array of pixels having the same dimension (width in pixels and height in pixels), as the input texture data. Each pixel of the filter control map may comprise R and B components of an RGB format. Thus, the filter control map may specify the horizontal pre-filter strength and the vertical pre-filter strength for the pixels of the texture, whereas the auxiliary mesh may specify the horizontal and vertical filter strengths at only the four corners of the texture, as well as at certain locations within the interior of the texture.

The auxiliary mesh can be constructed from the primary triangle mesh. There is a one-to-one correspondence between the vertices of the triangles listed in the primary triangle mesh and the vertices of the triangles listed in the auxiliary mesh. Also, there is a one-to-one correspondence between the triangles listed in the primary triangle mesh and the triangles listed in the auxiliary mesh. The auxiliary mesh consists of a list of vertices with each vertex having (X,Y,Z,R,B) values and a list of triangles using the vertices. A triangle is a subset of three of these vertices in the vertex list. The (X,Y) coordinates of the vertices in the vertex list map into the rectangular array of pixels forming the input texture. The (R, B) values at each vertex are the color-encoded filter strengths in standard 24-bit RGB format as described herein. Other formats can be used.

With the assumption that every 2D point in the texture is mapped to exactly one point in a 3D texture mapped surface (which is a common situation in texture mapping, especially for 3D video effects), four of the auxiliary mesh vertices map to the four corners of the texture, and the other vertices map to points in the interior of the texture rectangle. For example, the range of X and Y values is given by:

Minimum X ←→Left edge of texture Maximum X ←→Right edge of texture

Minimum Y ←→Bottom edge of texture Maximum Y ←→Top edge of texture

Each triangle in the auxiliary mesh corresponds to a triangular area of the input texture. Taken together, all the triangles of the auxiliary mesh exactly cover the input texture, and none of the triangles in the auxiliary mesh overlap any other triangle, except for possibly sharing a vertex or a common edge between two vertices.

While the assumption that every 2D point in the texture is mapped to exactly one point in the 3D texture-mapped surface can be appropriate to texture mapping as applied to video effects, there are some uses of texture mapping where this assumption is inapplicable. For example, the texture coordinates in a triangle mesh used for texture mapping can go outside the bounds of the texture rectangle, and "wrap-around" to produce a texture tiling effect. OpenGL, for example, has a texturing mode named Repeat that can produce a texture tiling effect. Some textures, such as wallpaper, are designed to tile together seamlessly. In certain embodiments, the auxiliary mesh can be adapted to address wrap around effects. Wrap-around effects can be accounted for by finding the range of texture coordinates used in the primary triangle mesh, constructing a larger texture from multiple tiles of the original texture, and modifying the texture coordinates in the primary triangle mesh to produce the same texture mapping, but with the new, larger texture.

Figure 5:
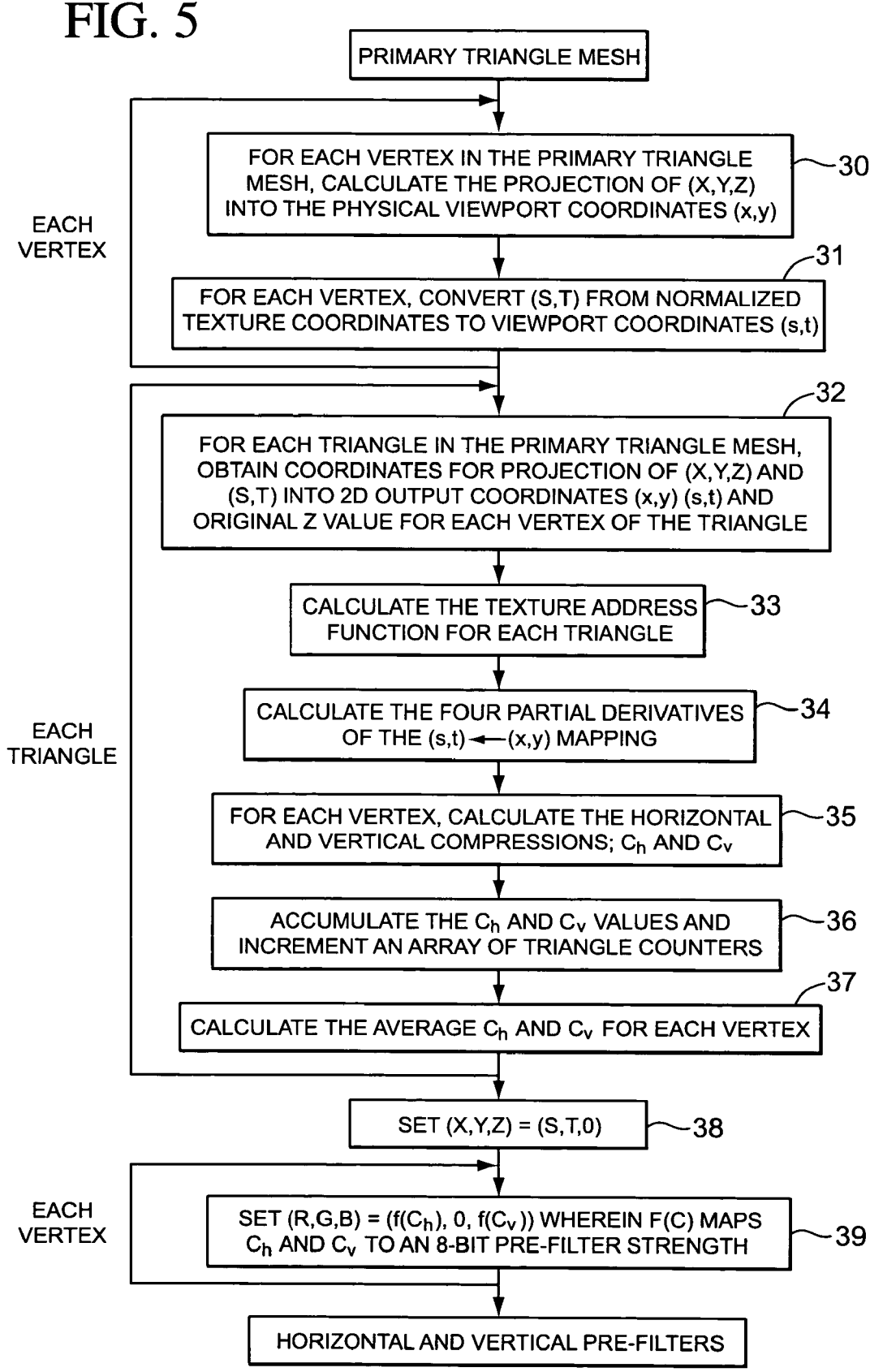
FIG. 5 is a block diagram of steps used to generate an auxiliary mesh and filter control map consistent with certain embodiments of the present invention.

FIG. 5 shows a block diagram of steps that can be used to construct the auxiliary mesh from the primary triangle mesh. The auxiliary mesh is the triangle mesh that defines the texture mapping to be performed. The auxiliary mesh may be generated by computing the horizontal compression and the vertical compression for each vertex of the primary triangle mesh. The compression values represent a measure of the change in the dimensions of a texel resulting from the transformation of a texture in texture coordinates (S,T) to pixel unit coordinates (s,t). For example, the compression measures the maximum change in pixel units in either the horizontal or vertical texture coordinate due to moving one pixel unit in any direction in the output image.

The horizontal and vertical compression values in turn can be used to determine the horizontal and vertical pre-filter strengths for the pre-filter operations. In certain embodiments, the horizontal and vertical compression values can be used to determine values for one or more pre-filter characteristics. Using OpenGL notation, the primary triangle mesh comprises a list or an array of vertices specified by at least the 3D coordinates (X,Y,Z) of each vertex and the texture coordinates (S,T) of each vertex. In addition, the primary triangle mesh may comprise a list of triangles. Each triangle comprises a subset of three vertices from the vertex list. A triangle in the primary triangle mesh can be specified by listing (X,Y,Z) and (S,T) for each of the three vertices, or by three vertex numbers, which are indices in the vertex list.

With reference to FIG. 5, the following steps may be used to generate the auxiliary mesh (step 22 in FIG. 4). In first step 30, the projection of (X,Y,Z) to physical viewport coordinates (x,y) may be calculated for each vertex in the primary triangle mesh. This can be accomplished by: (i) first transforming (X,Y,Z) by the 3D transformation matrix being applied to the entire primary triangle mesh; (ii) projecting the transformed (X,Y,Z) with the current perspective or orthogonal viewing transformation into normalized 2D coordinates; and (iii) performing a 2D transform of the result of (ii) into 2D viewport coordinates in pixel units. The 2D viewport coordinates transformed from (X,Y,Z) in 3D represent the location in (x,y) pixel-unit coordinates of each vertex n the 2D rendered output image.

After the transformed 2D viewport coordinates are determined in step 30, in step 31 the normalized texture coordinates (S,T) are converted to texture coordinates in pixel units (s,t). Pixel unit coordinates (s,t) identify the location of a texture texel (x,y) in the 2D rendered output image.

Steps 30 and 31 may be repeated for each vertex in the primary triangle mesh.

For each triangle in the primary triangle mesh, the following calculations may then be performed. In step 32, for each of the three vertices of a triangle, the five values corresponding to the transformed object and texture coordinates calculated in steps 30 and 31 and the original Z values for each of the three vertices are compiled. The 18 values for each triangle can be identified as $(x_1,y_1,z_1)$, $(s_1,t_1)$, $(x_2,y_2,z_2)$, $(s_2,t_2)$, $(x_3,y_3,z_3)$, $(s_3,t_3)$, and $Z_1$, $Z_2$, and $Z_3$.

Then, in step 33, the texture address function for the triangle that maps all (x,y) in the triangle to (s,t) is calculated. The texture address function has the form:

$$s(x,y)=(C_1 x+C_2 y+C_3)/(C_7 x+C_8 y+C_9)$$

$$t(x,y)=(C_4 x+C_5 y+C_6)/(C_7 x+C_8 y+C_9)$$

Linear algebra techniques can be used to solve for the nine coefficients of a function in the above form that maps $(x_1,y_1)$ to $(s_1,t_1)$, $(x_2,y_2)$ to $(s_2,t_2)$, and $(x_3,y_3)$ to $(s_3,t_3)$. For example, a 3×3 matrix of 2×2 determinants involving the 18 vertex coordinates can be calculated such that the nine coefficients are determinants of 2×2 minors for the 3×3 matrix. Other methods can be used to find the (s,t)←(x,y) mapping, or texture address function, for the triangle. The same or similar computation is performed in the standard setup calculations for many graphics pipelines.

In step 34, the four partial derivatives of the (s,t)←(x,y) mapping are calculated, where the four partial derivatives are ds(x,y)/dx, ds(x,y)/dy, dt(x,y)/dx, and dt(x,y)/dy. Differential calculus yields formulae for these four partial derivatives in terms of the nine coefficients, $C_1$, $C_2$, $C_3$, $C_4$, $C_5$, $C_6$, $C_7$, $C_8$, and $C_9$ of the (s,t)←(x,y) texture address function.

Next, in step 35, for the vertices of the triangle, the horizontal and vertical compression values, $C_h$ and $C_v$, respectively, may be calculated as a function of the four partial derivatives calculated in the previous step where:

$$C_h=sqrt[(ds(x,y)/dx)*(ds(x,y)/dx)+(ds(x,y)/dy)*(ds(x,y)/dy)]$$

$$C_v=sqrt[(dt(x,y)/dx)*(dt(x,y)/dx)+(dt(x,y)/dy)*(dt(x,y)/dy)]$$

In step 36, the $C_h$ (horizontal) and $C_v$ (vertical) compression values for the three vertices of each triangle are accumulated into the corresponding three elements of an array over vertices of $C_h$ sums and a parallel array of $C_v$ sums. Also, the corresponding elements in a parallel array of triangle counters are incremented, wherein the counters count the number of triangles using each vertex. All three parallel arrays over vertices are initialized to zero before processing the first vertex.

In step 37, for each vertex of the triangle, the $C_h$ sum for the vertex is divided by the triangle count for the vertex, and the $C_v$ sum for the vertex is divided by the triangle count for the vertex to obtain an average or normalized $C_h$ and $C_v$ values over the triangles sharing the vertex. The normalized $C_h$ and $C_v$ values at each vertex are used to generate the auxiliary mesh. The horizontal compression, $C_h$, is a measure of the maximum change in pixel units in the horizontal texture coordinate 's' upon moving one pixel unit any direction in the output image. The vertical compression, $C_v$, is a measure of the maximum change in pixel units in the vertical texture coordinate, 't' upon moving one pixel unit any direction in the output image. Higher $C_h$ values require more horizontal texture pre-filtering to avoid or minimize aliasing. Higher $C_v$ values require more vertical texture pre-filtering to avoid or minimize aliasing.

Steps 30 through 37 are repeated for each triangle in the primary triangle mesh.

In step 38, for each vertex in the primary triangle mesh, the corresponding vertex of the auxiliary mesh can be constructed by first setting (X,Y,Z)=(S,T,0). Each triangle in the output image, as defined by the primary triangle mesh, correspond to a triangle within the texture. Together, all triangles in the auxiliary mesh exactly cover the area or rectangle corresponding to the texture, or at least cover the portion of the texture which is used in the primary triangle mesh.

In step 39, the $C_h$ and $C_v$ values calculated in step 37 may be used to determine values for at least one pre-filter characteristic, such as, for example, pre-filter strengths, by setting (R,G,B)=(f($C_h$), 0, f($C_v$)), where f(C) maps $C_h$ and $C_v$ to an 8-bit pre-filter strength, for example, a number in the range {0,1, . . . , 255}. In certain embodiments, f(C) can be:

$$f(C)=0 \text{ if } C \leq 1$$

$$f(C)=256*(1-1/C) \text{ if } 1<C\leq 256$$

$$f(C)=255 \text{ if } 256<C$$

An f(C) such as the one defined above maps C←1 into zero (no filtering) because the texture mapping is magnified when C<1 and no pre-filtering is required. In general, pre-filters do not handle compressions greater than a practical maximum very well. In this example, the maximum C that is handled is 256, and all greater C values are pre-filtered the same way as C=256.

In the pre-filtering operation, the filter control map can control the local horizontal and vertical pre-filter strengths. In certain embodiments, the filter control map can control one or more pre-filter characteristics. The f(C) function implies that every 8-bit filter strength value corresponds to a particular 'C' value, which calls for a low-pass filter with a particular cut-off frequency. In the particular f(C) described above, this cut-off frequency is equal to 1/C times the Nyquist frequency of the original texture sampling, which equals 1/(2C) cycles per pixel. There are several widely used methods for computing low-pass FIR filter coefficients for a particular fractional cut-off frequency. In certain embodiments, the f(C) function maps 8-bit filter strength values to one of 256 sets of low-pass FIR filter coefficients, and the 'C' values for which the 256 FIR filter coefficient sets are calculated match the f(C) function. Other f(C) functions can be used.

In the calculation of the auxiliary mesh, the same vertex numbers may be used for all triangles in the auxiliary mesh as in the primary triangle mesh. In certain embodiments wherein vertex arrays and indexed triangle lists are used to represent the primary triangle mesh, the list of vertex index triplets for each triangle in the auxiliary mesh and the primary triangle mesh are identical.

The filter control map can be generated from the auxiliary mesh using a 2D interpolation process (step 23 in FIG. 4). The auxiliary mesh can specify values for the horizontal and vertical pre-filter strengths at the four corners of the input texture and at several points inside the texture. The filter control map can be generated by enumerating the pixels encompassed by each triangle of the auxiliary mesh, and for each of these pixels, computing the RB value that encodes the correct horizontal and vertical pre-filter strength at each pixel. The RB values for the pixels inside a triangle are between the three RB values at the triangle vertices. Determining the RB values for each pixel inside each triangle of the auxiliary mesh generates the filter control map. The filter control map can comprise a h×w RB array, where h×w corresponds to the indices for the array of texture texels. In certain embodiments, the value for the horizontal pre-filter strength is encoded into R, and the value for the vertical pre-filter strength is encoded into B for each component of the array.

The mathematically exact approach to generate the filter control map is to recalculate the same complex formulae used to generate the RB values for each pixel, i.e., calculate the pre-filter strengths at the vertices of the auxiliary mesh. However, this approach can be computationally impractical. Methods and apparatus consistent with the invention provide excellent results with far less demand on computational resources.

Generating the filter control map by linearly interpolating between the values for a filter characteristic, such as the filter strength, encoded into the RB color at each vertex of the auxiliary mesh represents a practical approximation of the mathematically correct method. The error of the linear interpolation quickly approaches zero as the number of triangles in the auxiliary mesh increases. If necessary to eliminate or reduce aliasing artifacts, it can be a straightforward matter to sub-divide these triangles into smaller triangles, which can reduce the error to an arbitrarily small value.

Standard rendering methods can be used to generate the filter control map from the auxiliary mesh. If the auxiliary mesh is rendered into a viewport having the same pixel count as the input texture in the texture mapping, then the texture-mapped image is a completely filled rectangular array of pixels exactly equal in size to the input texture. A reasonable filter control map can be generated by using the average RB values over the three vertices of each triangle as an approximation value for the entire triangle. However, this method can produce discontinuities along triangle edges. Nevertheless, with a sufficient number of triangles, the discontinuities can be sufficiently small so as to have a negligible effect on pre-filtering.

Another method that can be used to render the filter control map from the auxiliary mesh is to use "smooth shading," also known as Gouraud shading. This rendering method can produce smooth color gradations over triangles and across triangle edges while preserving the color specified for each mesh vertex. In "smooth shading" rendering, the color within each triangle is linearly interpolated between the three colors at the three vertices. When RB values are used to represent horizontal and vertical pre-filter strengths, "smooth shading" performs the exact linear interpolation of filter strength across the triangles of the auxiliary mesh to produce the filter control map. "Smooth shading" rendering of the auxiliary mesh into a viewport with a size equal to that of the texture can produce a filter control map which is a good approximation of the mathematically correct filter control map. Other interpolation methods can be used.

The filter control map comprising an h×w array of values for horizontal and vertical pre-filter strengths encoded into the RB color can then be convoluted with the h×w RGB input texture to provide a horizontally and vertically pre-filtered texture (steps 24 and 25 in FIG. 4). The horizontally and vertically pre-filtered texture can then be provided as an input into any appropriate 3D texture mapping process and rendered into a 3D image, for example, on a viewport In certain embodiments, the filter control map comprises an h×w array of values for at least one pre-filter characteristic.

In certain embodiments, anti-aliasing methods consistent with the invention can be used in texture mapping any DVE image. The disclosed methods can be implemented as software, a combination of software and standard hardware such as a GPU, or a combination of software, a GPU, and custom hardware. The custom hardware can comprise a 3D graphics chip. In certain embodiments, the disclosed methods can be used for processing real time video input textures on a GPU. Rendering real time video input textures can comprise, for example, the following implementation: (i) using a GPU processor involving at least a hundred floating-point operations per triangle in the primary triangle mesh to generate the auxiliary control mesh; (ii) using a CPU to render the filter control map for horizontal pre-filtering the primary triangle mesh; (iii) using a GPU pixel shader with a two texture input comprising the input texture and the filter control map for vertical pre-filtering the primary triangle mesh; (iv) using a GPU pixel shader with a two texture input comprising the horizontally pre-filtered texture and the filter control map; and (v) using a GPU with bilinear interpolation to texture map the horizontally and vertically pre-filtered texture data. In certain embodiments, the horizontal and vertical pre-filter operations can be performed using hardware rather than pixel shaders to increase the speed of the texture mapping process.

Other embodiments will be apparent to those skilled in the art from consideration of the specification and practice of the invention disclosed herein. It is intended that the specification and examples be considered as exemplary only.

What is claimed is:

1. A computer-implemented method of producing graphics image data comprising:
   receiving texture data and object data for the graphics image;
   generating a primary polygon mesh comprising a list of polygons, polygon vertices, and texture for the graphics image from the texture data and object data;
   generating an auxiliary mesh comprising values for at least one pre-filter characteristic for polygon vertices of the primary polygon mesh;
   rendering a filter control map from the auxiliary mesh;
   pre-filtering the texture data, wherein values for at least one pre-filter characteristic are determined by the filter control map; and
   texture mapping the pre-filtered texture data and primary polygon mesh to generate the graphics image.

2. The method of claim 1, wherein the polygon mesh is a triangle mesh comprising a list of triangles, triangle vertices, and texture for the graphics image from the texture data and object data.

3. The method of claim 1, wherein the auxiliary mesh comprises a list of values for at least one pre-filter characteristic corresponding to each polygon vertex of the primary polygon mesh.

4. The method of claim 1, wherein the values for at least one pre-filter characteristic represent a measure of the maximum change in the texture due to moving at least one pixel in the rendered graphics image.

5. The method of claim 1, wherein the auxiliary mesh comprises a list of values for at least one horizontal pre-filter characteristic and values for at least one vertical pre-filter characteristic corresponding to vertices of the primary polygon mesh.

6. The method of claim 5, wherein the values for the at least one horizontal pre-filter characteristic and the at least one vertical pre-filter characteristic represent a measure of the maximum change in the texture due to moving at least one pixel in the rendered graphics image.

7. The method of claim 1, wherein rendering the filter control map comprises interpolating average values for at least one pre-filter characteristic for polygon vertices listed in the auxiliary mesh to generate an array of encoded values for at least one pre-filter characteristic.

8. The method of claim 7, wherein interpolating comprises linearly interpolating.

9. The method of claim 1, wherein rendering the filter control map comprises interpolating average values for at least one pre-filter characteristic for each polygon vertex listed in the auxiliary mesh to generate an array of encoded values for at least one pre-filter characteristic.

10. The method of claim 1, wherein rendering the filter control map comprises linearly interpolating average values for at least one horizontal pre-filter characteristic and average values for at least one vertical pre-filter characteristic for the vertices listed in the auxiliary mesh to generate an array of encoded values for at least one horizontal pre-filter characteristic and encoded values for at least one vertical pre-filter characteristic.

11. The method of claim 10, wherein the array of encoded filter values has the dimensions of the texture data.

12. The method of claim 1, wherein the filter control map comprises an array of encoded values for at least one pre-filter characteristic.

13. The method of claim 12, wherein the array of encoded filter values has the dimensions of the texture data.

14. The method of claim 12, wherein the encoded values for the at least one pre-filter characteristic determines a cut-off frequency of a finite impulse response filter.

15. The method of claim 1, wherein the filter control map comprises an array of encoded values for at least one horizontal pre-filter characteristic and encoded values for at least one vertical pre-filter characteristic.

16. The method of claim 15, wherein the encoded values for the at least one horizontal pre-filter characteristic and the encoded values for the at least one vertical pre-filter characteristic determines a cut-off frequency of a finite impulse response filter.

17. The method of claim 1, wherein Gouraud shading is used to render the filter control map from the auxiliary mesh.

18. The method of claim 1, wherein pre-filtering the texture data comprises horizontally pre-filtering the texture data, wherein at least one characteristic of the horizontal pre-filter is determined by the filter control map, and vertically pre-filtering the horizontally pre-filtered texture data, wherein at least one characteristic of the vertical pre-filter is determined by the filter control map.

19. A system for producing graphics image data, comprising:
   a memory configured to store instructions; and
   a processor configured to execute the instructions stored in the memory:

to receive texture data and object data for a graphics image;

to generate a primary polygon mesh comprising a list of polygons, polygon vertices, and texture for a graphics image from the texture data and object data;

to generate an auxiliary mesh comprising encoded values for at least one pre-filter characteristic for polygon vertices of the primary polygon mesh;

to generate a filter control map from the auxiliary polygon mesh;

to pre-filter the texture data, wherein at least one characteristic of the pre-filter is determined by the filter control map; and to texture map the pre-filtered texture data and the primary polygon mesh to generate the graphics image data.

20. The system of claim 19, wherein the primary polygon mesh is a triangle mesh comprising a list of triangles, triangle vertices, and texture for a graphics image from the texture data and object data.

21. The system of claim 19, wherein the auxiliary mesh comprises encoded values for at least one pre-filter characteristic for each polygon vertex of the primary polygon mesh.

22. The system of claim 19, wherein to pre-filter the texture data comprises to horizontally pre-filter the texture data, wherein at least one characteristic of the horizontal pre-filter is determined by the filter control map; and to vertically pre-filter the horizontally pre-filtered texture data, wherein at least one characteristic of the vertical pre-filter is determined by the filter control map.

23. The system of claim 19, wherein to texture map comprises texture mapping horizontally and vertically pre-filtered texture data and the primary polygon mesh to generate the graphics image data.

24. The system of claim 19, wherein to generate an auxiliary mesh comprising encoded values for at least one pre-filter characteristic for each polygon vertex of the primary polygon mesh.

25. A computer-readable medium storing instructions executable by a processor to perform a method of producing graphics image data comprising:

receiving texture data and object data for the graphics image;

generating a primary polygon mesh comprising a list of polygons, polygon vertices, and texture for the graphics image from the texture data and object data;

generating an auxiliary mesh comprising values for at least one pre-filter characteristic for polygon vertices of the primary polygon mesh;

rendering a filter control map from the auxiliary mesh;

pre-filtering the texture data, wherein values for at least one pre-filter characteristic are determined by the filter control map; and texture mapping the pre-filtered texture data and primary polygon mesh to generate the graphics image data.

\* \* \* \* \*